3,213,452
METHOD OF CONSTRUCTING A FILTER BY DISPLACEMENT AND REVERSAL OF THE SCALE OF FREQUENCIES
Michel Henri Gerard Joseph Carpentier, Antony, and André Adamsbaum, Boulogne-Billancourt, France, assignors to Etat Francais, represented by the Secretary of State for Armed Forces (Air), Paris, France
Filed July 26, 1960, Ser. No. 45,503
5 Claims. (Cl. 343—17.2)

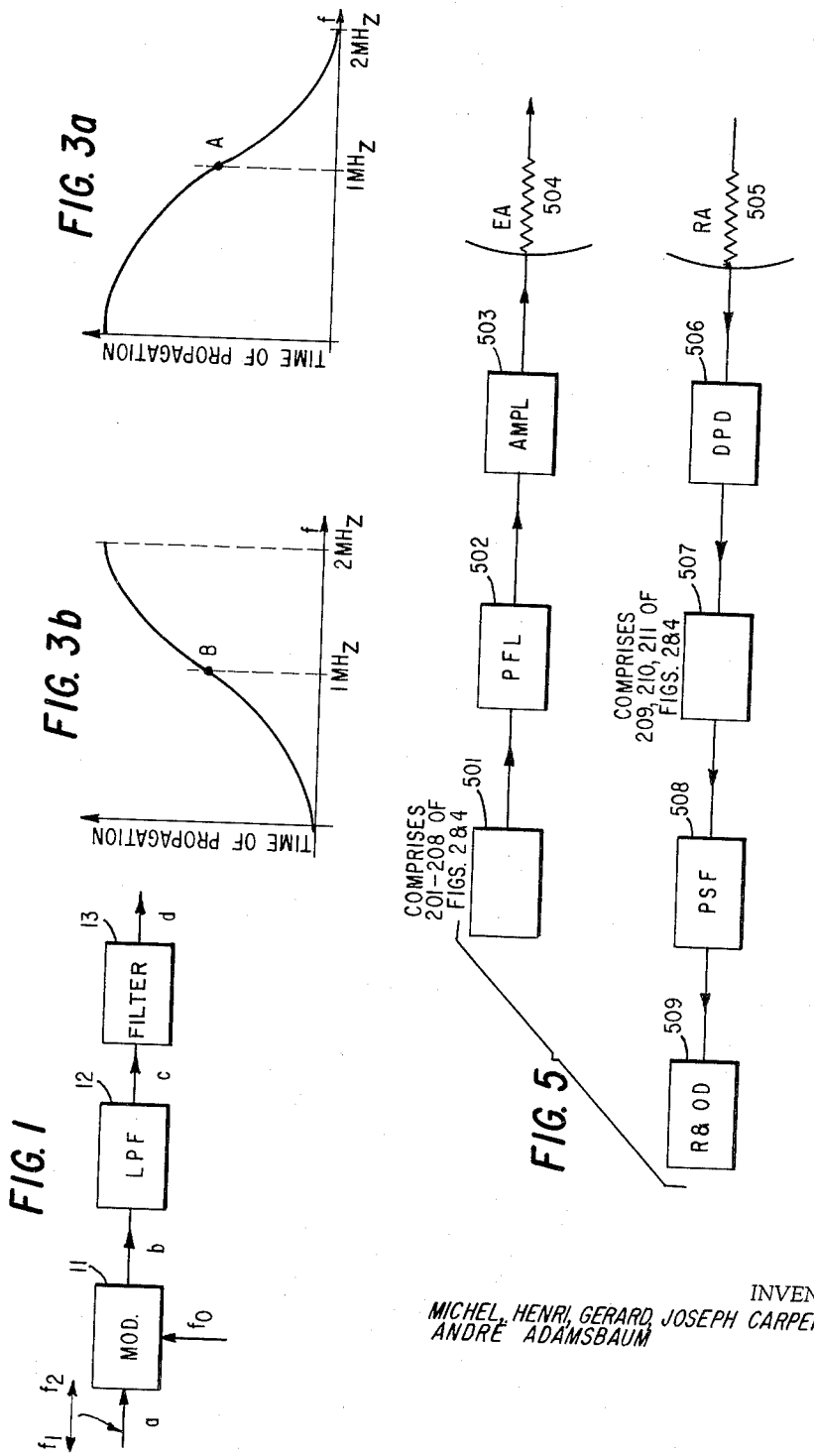

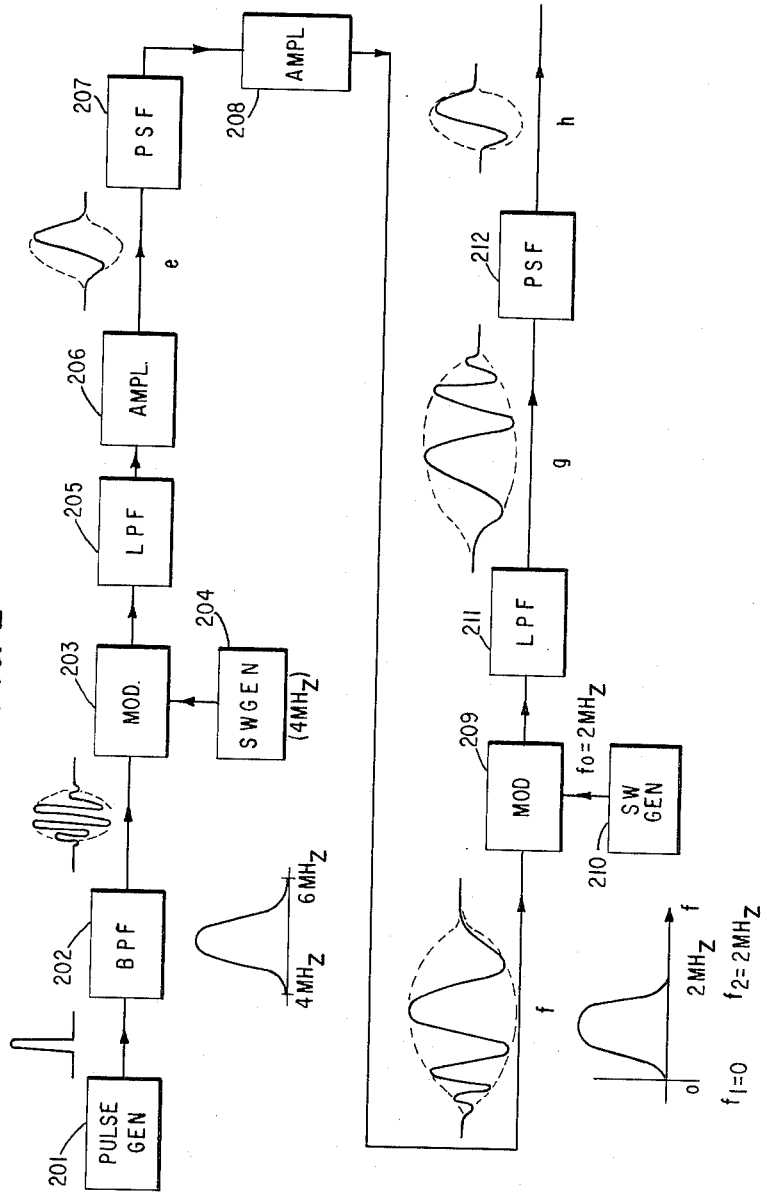

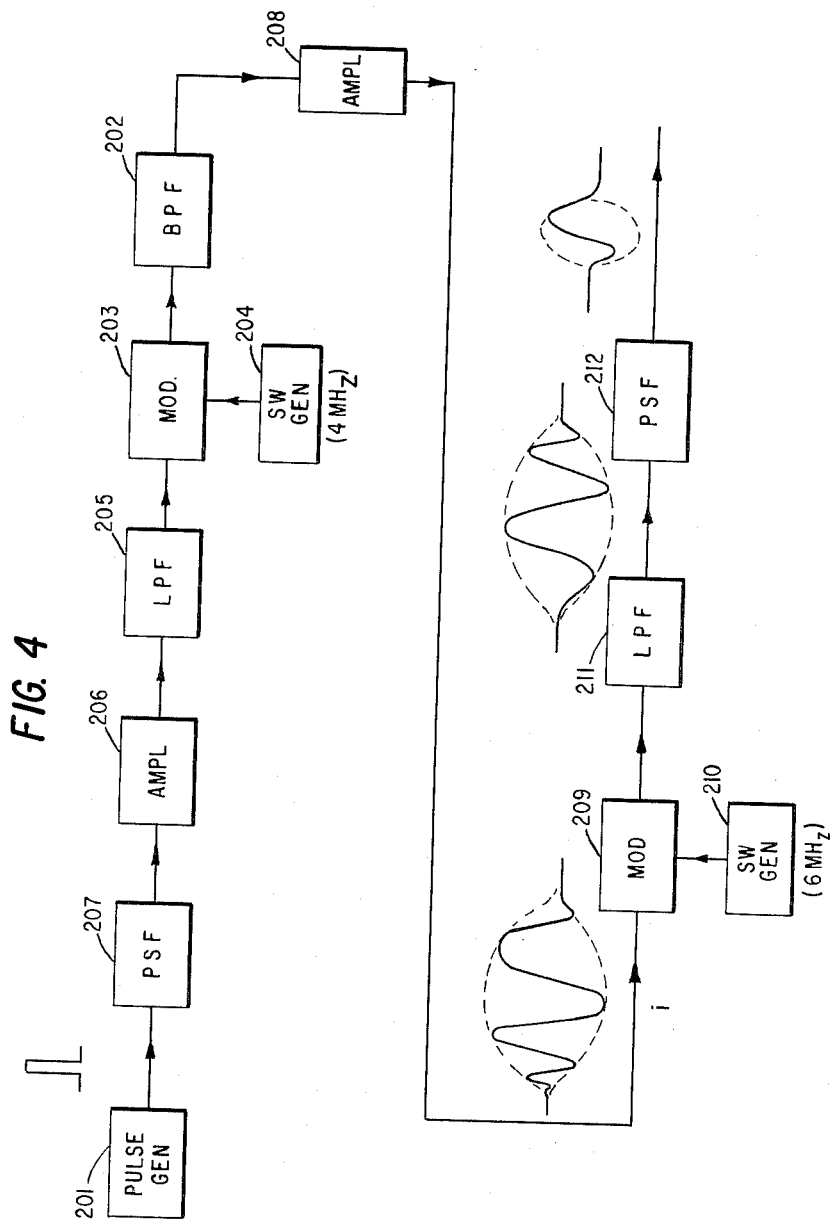

The present invention relates to a method of constructing a filter by displacement and reversal of the scale of frequencies, and the filters obtained by the application of this method.

A filter is understood in this case to mean a device which modifies in a known manner the characteristics of the spectrum of a signal which passes through the device (amplitude and phase of the components of the spectrum).

It is well known that certain filters are either impossible or difficult to construct. Thus, for example, whereas the construction of a filter of the pure phase shifting type that is to say which does not modify the relative amplitudes of the components of the spectrum of a signal passing through such a filter, is easy and inexpensive in the case in which the group-propagation time decreases in a practically linear manner when the frequency increases, at least in the useful band of frequencies, the construction of a filter of the pure phase shifting type having a group-propagation time which increases in a practically linear manner as the frequency increases in a fairly wide range of frequencies, is difficult and expensive.

The present invention has for its object to overcome these difficulties by providing a simple and inexpensive method of construction of a device which makes it conveniently possible to obtain the same results as with a theoretical filter which is either impracticable or difficult to construct.

The method in accordance with the present invention is characterized by the simultaneous use of a device for the modulation of the incident signal by a sine-wave of fixed frequency which is higher than the frequencies of the useful spectrum of the incident signal, of a first conventional filter device which eliminates certain undesirable high-frequency components of the spectrum passing out of the modulation device, and of a second conventional filter device which modifies in a known manner the components of the spectrum passing out of the first filter device, the order of the said filter devices being capable of being modified in certain cases.

A filter device of the type obtained by the application of the present method comprises a modulator which receives a wave having a suitable fixed frequency $f_0$ and an input signal, the energy of which is comprised between two frequencies $f_1$ and $f_2$, which are less than $f_0$ and which convert the said input signal to a signal whose energy is comprised between $f_1+f_0$ and $f_2+f_0$ on the one hand, and between $f_0-f_2$ and $f_0-f_1$ on the other hand; in the spectrum which passes out from said modulator, a low-pass filter eliminating the components comprised between $f_0+f_1$ and $f_0+f_2$; and a filter which modifies in known manner the components comprised between $f_0-f_1$ and $f_0-f_2$ of the spectrum which passes out from the said low-pass filter.

The filtering arrangements in accordance with the present invention lend themselves particularly well to one condition of use in the case of impulse transmission apparatus (radar for example), and provide a convenient means of producing a reduction of the instantaneous power outputs emitted without modification of the performances, and, in consequence, a substantial improvement in those performances, taking into account the practical limitations of the instantaneous power outputs which it is possible to generate.

Further characteristic features and advantages of the present invention will be brought out in the description which follows below, reference being made to the accompanying drawings, in which:

FIGURE 1 is the diagram of one form of embodiment of the device in accordance with the invention, FIGURE 2 is the diagram of a device which employs a filter in accordance with the present invention, FIGURES 3a and 3b are curves which represent the time of propagation as a function of the frequency, respectively in the case in which the said time decreases with the frequency and in the case in which the time increases with the frequency, FIGURE 4 is a diagram of an alternative form of the device which is illustrated in FIGURE 2, FIGURE 5 is the diagram of a radar installation which makes use of a filter device in accordance with the present invention.

The device shown in FIGURE 1 comprises:

A device 11 for the modulation of the sine-wave having a suitable fixed frequency $f_0$, the said device converting a signal, the energy of which can be considered as comprised between two frequencies $f_1$ and $f_2$, which are lower than $f_0$, to a signal of which the energy can be considered as comprised between $f_1+f_0$ and $f_2+f_0$ on the one hand, and between $f_0-f_2$ and $f_0-f_1$ on the other hand, i.e., upper and lower sidebands, respectively.

A conventional low-pass filter 12, being used to eliminate the components of the first spectrum comprised between $f_0+f_1$ and $f_0+f_2$.

A filter 13, easy to construct, which modifies in a known manner the components of the second spectrum (comprised between $f_0-f_2$ and $f_0-f_1$).

If, for example, the incident signal at $a$ is a signal with linear frequency modulation, the frequency of which decreases with increasing time, the signal spectrum being practically comprised between the frequencies $f_1$ and $f_2$—and if, in addition, the filter 13 is a filter (usually of the pure phase shifting type) having a group-propagation time which decreases in a practically linear manner when the frequency increases (at least in the useful band comprised between $f_0-f_2$ and $f_0-f_1$), the system of devices between $a$ and $d$ behaves, for the incident signal at $a$, as a filter (usually of the pure phase shifting type), the group-propagation time of which increases in a practically linear manner as the frequency increases.

In a more particular case, the frequency $f_0$ can be chosen so as to be equal to the sum of the frequencies $f_1$ and $f_2$. In this case, the suitable modulation of the incident signal at $a$ can be obtained by passing through a filter which is identical to the filter 13, of a pulse signal which will appear at $d$ in its original form but displaced in time by a given quantity.

It should be noted that the filter 13 does not need to be perfect in order that this latter result should be fully effective.

The device illustrated in FIGURE 2, and constituting a device which make use of a filter in accordance with the present invention, comprises essentially:

A generator 201 of short impulses of any desired form, having a length less than 0.1 microsecond for example, A band-pass filter 202, of which the symmetrical passband having a width of 2 megacycles is centered on 5 megacycles, A modulator 203, A pure sine-wave generator 204, at 4 megacycles, A low-pass filter 205 which eliminates frequencies higher than 3 megacycles approximately, An electronic amplifier 206 of conventional type, A filter 207 usually of the pure phase shifting type in which the curve of group-propagation time as a function of the frequency is decreasing. This curve does not need to be linear, on the condition that it is roughly symmetrical with respect to the point A corresponding to a frequency of 1 megacycle (see FIGURE 3a): a filter of this type is easy to construct;

An electronic amplifier 208 of conventional type,

A modulator 209,

A pure sine-wave generator 210 at 2 megacycles,

A low-pass filter 211 which eliminates frequencies higher than 2 megacycles,

A filter 212, identical to 207 which, in certain cases, can be merged with this latter.

The devices 211 and 212 can also be interchanged without modification of the result.

The system of units 209, 210, 211 and 212 behaves in respect of the signal located at $f$ as a filter of the pure phase shifting type in which the curve of propagation time as a function of the frequency would be increasing and would have the form illustrated in FIGURE 3b.

The system of units 203, 204, 205, 206, 207 and 208 also constitutes in turn a first filter device which serves to employ the device which follows.

The system of units 207, 208, 209, 210, 211 and 212 behaves for the signal located at $e$ as a delay-line which does not distort the signal.

It should be noted that the signals at $f$ and at $g$ are longer than the output signal at $h$. Between $f$ and $h$ (or between $g$ and $h$) a time-compression of the signal has been effected. The signal at $f$ has been shortened, without modification of the amplitude of the components of its spectrum only the phases of the said components being modified.

It should be finally noted that in the case of the installation illustrated in FIGURE 2, the same result can be obtained by replacing the devices 209, 210, 211 and 212 by any device which converts the signal $f$ to a signal $g$, that is to say, by designating as $V(t)$ the variation of the signal $f$ as a function of time, by any device which transforms $V(t)$ into $V(t_0-t)$ (recording of $V(t)$ read in reverse, for example, although the device shown in FIGURE 2 is the most economic in a large number of applications).

The elements of the filter in accordance with the present invention and which form part of the device described above and as illustrated in FIGURE 2 can, in accordance with an alternative form illustrated in FIGURE 4, be assembled together in a different order, namely:

The short impulse generator 201, the pure phase shifting filter 207, the amplifier 206, the low-pass filter 205, the modulator 203, coupled to the output of the device 205, and to the generator 204 which supplies in this case a frequency of 4 megacycles, the band-pass filter 202, the amplifier 208, the modulator 209, coupled to the output of the said amplifier 208 and to the generator 210 which supplies in this case a frequency of 6 megacycles, the low-pass filter 211, the pure phase shifting filter 212, the filters 211 and 212 being in any case interchangeable.

The system of elements 201 to 208 plays exactly the same part as in the previous device.

It should be noted that the frequencies indicated in the case of certain elements of the devices illustrated in FIGURES 2 and 4 are adapted to a particular example and that they have to be modified if the conditions vary.

FIGURE 5 illustrates an example of an installation of radar apparatus which essentially comprises:

A device 501, similar to the devices illustrated in FIGURES 2 and 4, comprising the elements 201, to 208, or similar elements.

A conventional device 502 which has the general effect of producing a displacement F of the spectrum towards the high frequencies, whether preceded or not by a non-linear device with the object of ensuring greater constancy of the instantaneous energy of the signal, such as for example, a peak-flattening device or limiter, An amplifier 503 which substantially increases the level of the power outputs, An emission aerial 504, A receiving aerial 505, A conventional device 506, the general effect of which is to produce a displacement F towards the low frequencies of the spectrum, A device 507 in accordance with the present invention, comprising the units 209, 210 and 211 of FIGURES 2 and 4 or similar units, A unit 508, consisting essentially of a unit such as 212 of FIGURES 2 and 4, or a like unit, Reading and operating devices 509.

In a first alternative of this radar apparatus, the device 507 which comprises the units 209, 210 and 211 of FIGURES 2 and 4, is inserted in the chain after displacement of the spectrum towards the low frequencies by a quantity less than F, this displacement being subsequently completed before passing into the unit 508 and into the device 509.

In a more general manner, in a second alternative form of the said radar apparatus, the device 502 effects a certain number of transpositions of frequencies on condition that the number of transpositions which reverse the sign of the frequency modulation is an even number, while on the other hand, the devices 506 and 507 carry out an odd number of such transpositions.

In a third alternative form of this radar apparatus, the device 502 effects in all an odd number of transpositions which reverse the sign of the frequency-modulation whilst the devices 506 and 507 carry out in all an even number of such transpositions.

In a fourth alternative form, the second or third alternative form is employed either alternatively or contingently by switching, thereby obtaining signals, the displacement of which permits the measurement of the radial speed of targets illuminated by radar and which thus makes it more difficult to "jam" the apparatus.

In a fifth alternative form, the device 507 and the unit 508 is replaced by any device which transforms an input signal $V(t)$ into $V(t_0-t)$.

In a sixth alternative form, the preceding device is inserted before the emission.

In a seventh alternative form, the fifth and sixth alternative forms are employed either alternatively or contingently.

What we claim is:

1. The assembly of a filter device comprising
   (a) a modulator for receiving a wave of suitable fixed frequency $f_0$ and an input signal, the energy of which is comprised between two frequencies $f_1$ and $f_2$, lower than $f_0$, and transforming the said input signal into a signal whose energy is comprised between $f_1+f_0$ and $f_2+f_0$ on the one hand, and between $f_0-f_2$ and $f_0-f_1$ on the other hand,
   (b) a low-pass filter for eliminating in the spectrum delivered by the said modulator the components comprised between $f_0+f_1$ and $f_0+f_2$,
   (c) a filter for modifying in known manner the components comprised between $f_0-f_1$ and $f_0-f_2$ of the spectrum which passes out of the said low-pass filter,
   (d) the combination (a) to (c) preceded by a first filter device comprising the following units mounted in succession:
   (e) a modulator unit with a pure sine-wave,
   (f) a filter eliminating undesirable high frequencies,
   (g) an amplifier and a filter of the pure phase shifting type having a group-propagation time which decreases as the frequency increases, (h) the said filter device being supplied by a band-pass filter connected to a short-impulse generator.

2. The assembly of a filter device in accordance with claim 1, in which
   (i) the units which constitute the first filter device are intercalated between the short-impulse generator and the band-pass filter in the reverse order to that recited in claim 1.

3. The assembly in accordance with claim 1, in which
   (l) means are provided for the displacement of the spectrum in two stages, comprising a first unit before said filter device and a second unit after the said filter device.

4. The assembly in accordance with claim 3, in which
   (m) the spectrum displacement means effects a certain number of frequency transpositions, the number of transpositions which reverse the sign of the frequency modulation being an even number, while said filter device and the second displacement unit carry out in all a certain number of frequency transpositions comprising an odd number of transpositions which reverse the sign of the frequency modulation.

5. The assembly in accordance with claim 3 in which
   (m) the first spectrum displacement unit effects a certain number of frequency transpositions, the number of transpositions which reverse the sign of the frequency modulation being an odd number, while the filter device and the second displacement unit effect in all a certain number of transpositions of frequency comprising an even number of transpositions which reverse the sign of the frequency modulation.

References Cited by the Examiner
UNITED STATES PATENTS

| | | | |
|---|---|---|---|
| 2,406,316 | 8/46 | Blumlein | 343—17.1 |
| 2,624,876 | 1/53 | Dicke. | |

CHESTER L. JUSTUS, *Primary Examiner.*